(12) United States Patent
Yoneda

(10) Patent No.: US 6,873,761 B2
(45) Date of Patent: Mar. 29, 2005

(54) TEMPERATURE-INDEPENDENT ARRAYED WAVEGUIDE GRATING DEVICE

(75) Inventor: Shigeru Yoneda, Tokyo (JP)

(73) Assignee: NEC Corporation (JP)

( * ) Notice: Subject to any disclaimer, the term of this patent is extended or adjusted under 35 U.S.C. 154(b) by 184 days.

(21) Appl. No.: 09/751,086

(22) Filed: Dec. 29, 2000

(65) Prior Publication Data

US 2002/0122623 A1 Sep. 5, 2002

(51) Int. Cl.$^7$ ................................................ G02B 6/34
(52) U.S. Cl. ............................................ 385/37; 37/10
(58) Field of Search ............................. 385/37, 10, 14, 385/31, 4, 6, 11, 12, 13, 123, 124, 129

(56) References Cited

U.S. PATENT DOCUMENTS 5,940,548 A * 8/1999 Yamada et al. ............... 385/14

FOREIGN PATENT DOCUMENTS

| JP | 8-190026 | 7/1996 | |
|----|----------|--------|---|
| JP | 9-26516 | 1/1997 | |
| JP | 9-43440 | 2/1997 | |
| JP | 9-90153 | 4/1997 | |
| JP | 9-318831 | 12/1997 | |
| JP | 10-48443 | 2/1998 | |
| JP | 10-68833 | 3/1998 | |
| JP | 10-186167 | 7/1998 | |
| JP | 10-227930 | 8/1998 | |
| JP | 10-300953 | 11/1998 | |
| JP | 11038239 A | * 2/1999 | ............ G02B/6/12 |

OTHER PUBLICATIONS

Japanese Office Action issued Apr. 25, 2002 (w/ English translation of relevant portions).
H. Tanobe, et al., "Temperature Insensitive Arrayed Waveguide Gratings on InP Substrates", IEEE Photonics Technology Letters, vol. 10, No. 2, Feb. 1998, pp. 235–237.
Y. Inoue, et al., "Athermal Silica-Based Arrayed--Waveguide Grating Multiplexer", Electronics Letters, vol. 33, No. 23, Nov. 6, 1997, pp. 1945–1947.

* cited by examiner

Primary Examiner—Frank G. Font
Assistant Examiner—K. Cyrus Kianni
(74) Attorney, Agent, or Firm—Dickstein, Shapiro, Morin & Oshinsky, LLP.

(57) ABSTRACT

In an arrayed waveguide grating, a wedge-shaped groove formed in an arrayed waveguide section or a silica-based waveguide section in a periphery of the groove is modified in either one of the procedures below or in a particular combination thereof to suppress spreading of light in the groove to thereby reduce the excess loss due to addition of the groove. The material filled in the groove is a photosensitive material having a negative refractive index temperature coefficient. Using the photosensitivity, refractive index difference is provided in the groove to form optical waveguides in a horizontal direction or in vertical and horizontal directions. The material filled in the groove has a negative refractive index temperature coefficient to minimize a spreading angle of light incident to the groove. Width of each silica-based waveguide is enlarged before and after the groove to decrease the spreading angle of light incident to the groove. This method reduces the excess loss of the arrayed waveguide grating in which a wavelength characteristic is kept unchanged with respect to a change in ambient temperature.

7 Claims, 11 Drawing Sheets

F I G. 5
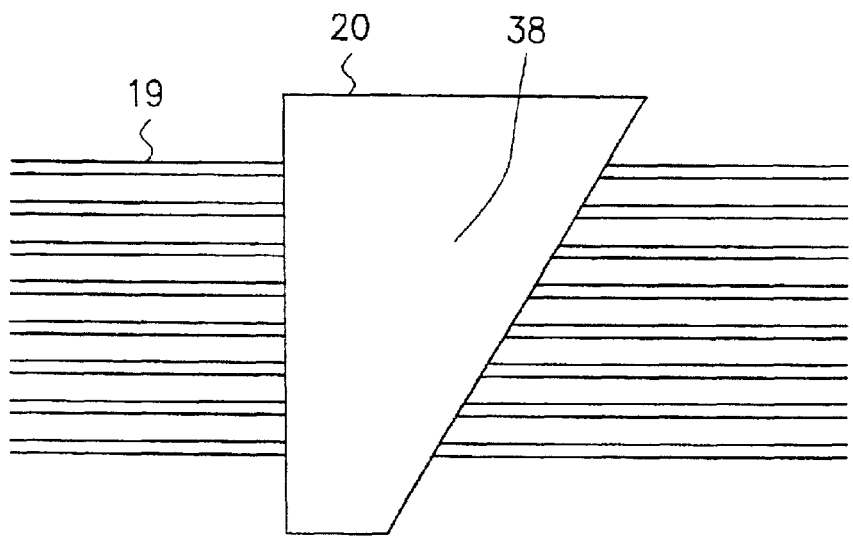

F I G. 7
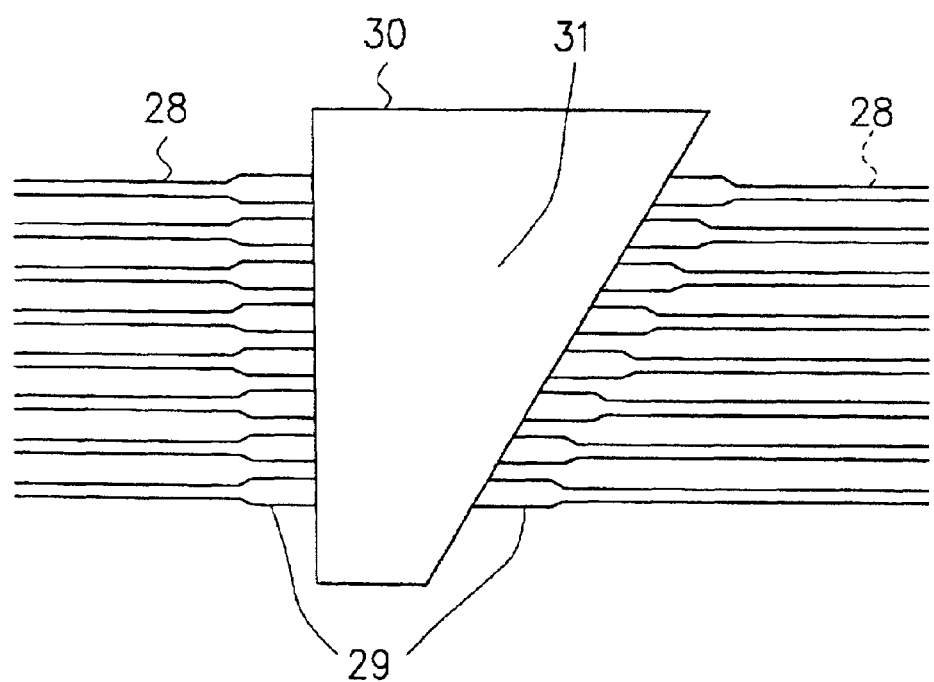

F I G. 11
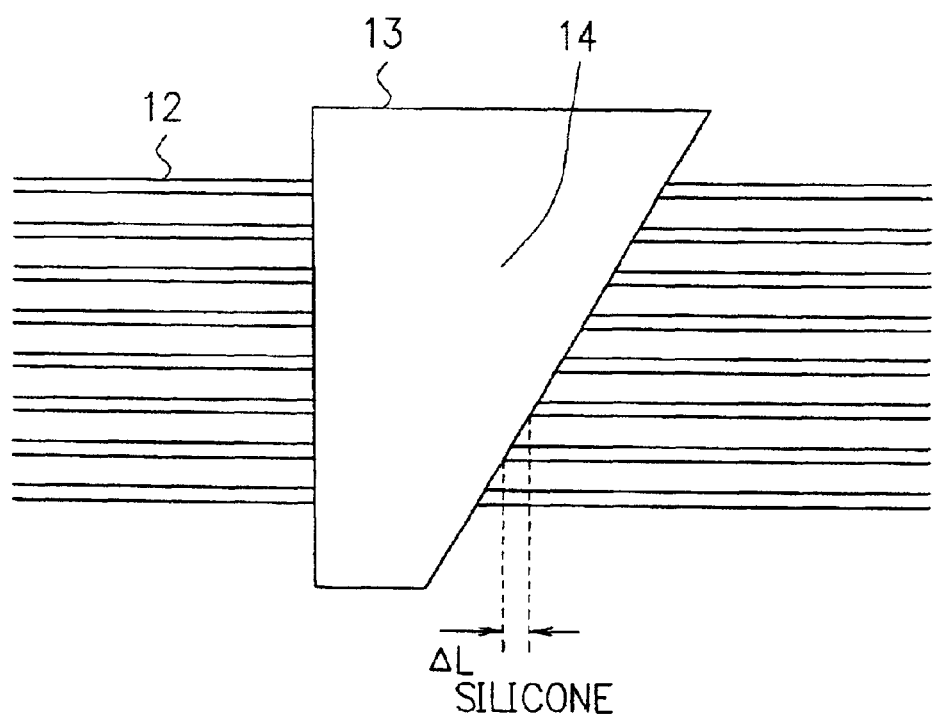

TEMPERATURE-INDEPENDENT ARRAYED WAVEGUIDE GRATING DEVICE

BACKGROUND OF THE INVENTION

The present invention relates to a technology to reduce dependence of an arrayed waveguide grating (AWG) on temperature. In particular, the present invention relates to a technology in which by removing temperature dependence of a wavelength characteristic of an arrayed waveguide grating, external temperature compensation by a Peltier device or the like which has been indispensable to attain stable multiplexing and demultiplexing characteristics in an optical communication system in the prior art can be dispensed with.

Prior Art

In an optical fiber communication system, when dense wavelength division multiplexing (DWDM) is employed to increase transmission capacity, a multiplexer and/or demultiplexer (optical filter) is quite important to multiplex and to demultiplex wavelengths.

Among various optical filters, an arrayed waveguide grating has a narrow-bandwidth wavelength characteristic and a high isolation ratio. The grating is a filter device of multiple input and multiple output type. Therefore, the filter device can demultiplex multiplexed signals and can multiplex demultiplexed signals. Using the optical filter, it is possible to easily configure a optical filter device.

When such a device includes a silica-based (or silica) waveguide, the device can efficiently coupled with an optical fiber so that the device operates with a low insertion loss of about several decibels (dB). The device consequently has attracted attention and has been intensively discussed and studied in the world.

FIG. 11 shows a general configuration of an arrayed waveguide grating of the prior art. In general, the grating includes at least one input waveguide 7, an input-side slab waveguide 8, arrayed waveguides 9 which are several tens to one hundred and several tens in number, output-side slab waveguide 10, and a plurality of output waveguides 11 as shown by FIG. 10.

In operation, multiplexed light incident to the input waveguides 7 spreads or expands in the input slab waveguide 8 to enter the arrayed waveguides 9, the light of each waveguides 9 having an identical phase (co-phase). The light in the respective arrayed waveguides 9 differ in incident light intensity from each other. The intensity shows substantially a Gaussian distribution.

The arrayed waveguides 9 differ in optical path length from each other. The difference is fixed so that the optical path sequentially increases or decreases in the waveguides 9. Therefore, light beams respectively propagating through the waveguides 9 arrive at the output slab waveguide 10 with a fixed phase difference therebetween. Due to chromanic dispersion, a cophasal surface inclines depending on the wavelength.

As a result, light beams focus at different positions depending on the wavelengths on an interface between the output slab waveguide 10 and the output waveguides 11. Therefore, by arranging an output waveguide at each focusing position, light having a desired wavelength can be attained from the output waveguide.

In the arrayed waveguide grating, the optical path difference is an essential parameter for wavelength selectivity as above. However, in the optical waveguide of the prior art, the optical path length depends on temperature. This leads to a problem of variation in a filter transmission bandwidth (central wavelength) depending on ambient temperature. For example, when the waveguide is made of silica-based glass, the central wavelength of the optical filter varies about 0.01 nanometer (nm; about 1.3 gigaherz (GHz) in notation of central frequency) at about every 1 degree due to the temperature dependence of the optical path length. In a device using a semiconductor-based material, the temperature dependence is about ten times the dependence above.

To remove the problem of temperature dependence, a high-precision temperature controller is added to the device in a known method. This however increases the system cost and the size of the device, and reliability of the overall system is lowered.

To remove the temperature dependence of the arrayed waveguide grating of the prior art, there has been proposed a method to cancel the temperature dependence of the optical path length difference in a arrayed waveguide section. The optical path length difference depends on temperature because of temperature dependence of a refractive index of the optical waveguide material and expansion coefficient or contraction of material of a substrate due to temperature change.

In the arrayed waveguide grating, the temperature dependence of the optical path length difference in the arrayed waveguide section is canceled, for example, as described by H. Tanobe et. al. in pages 235 to 237 of the "IEEE Photon. Technol. Lett.", Vol. 10, No. 2 1998. According to the article, waveguides are fabricated respectively with two different kinds of InP-based materials respectively having different values of the refractive index temperature coefficient to thereby disposing a waveguide section having a high refractive index temperature coefficient value and a waveguide section having a low refractive index temperature coefficient value. By adjusting lengths of the respective sections, the temperature dependence of optical path length is canceled in the arrayed waveguide section.

However, it is difficult to manufacture, in one plane, waveguides respectively with different materials (particularly, in a planar lightwave circuit). This leads to a problem of a complex and long production process. In the above-mentioned prior art, the optical waveguide is not constructed in the form of a planar lightwave circuit. The system includes a thin clad layer on a two-dimensional planar core layer and a lib is formed thereon. The structure is attended with a problem that light confinement is insufficient and radiation loss increases by bending or flexing the waveguide. The arrayed waveguide grating of the prior art has a total loss of 16 dB to 18 dB.

Like the article above, a relatively simple production process using two different kinds of materials having different refractive index temperature coefficient values has been described in pages 1945 to 1947 "Electron. Lett.", Vol. 33, No. 23, 1997 written by Y. Inoue et. al. As can be seen from FIG. 12, in arrayed waveguides 12 (a part of the arrayed waveguides 9 shown in FIG. 11), a groove 13 having a contour of a wedge is formed to reach a substrate. The groove 13 is filled with silicone 14 with a negative value of refractive index temperature coefficient to cancel with a positive value of the silica-based waveguide section. The temperature dependence of optical path length difference is thereby solved between the arrays.

In FIG. 12, assume that the silica-based waveguide section 12 has an equivalent refractive index of $n_{sio2}$, the silicone 14 has an equivalent refractive index of $n_{silicone}$, the waveguide length difference between adjacent waveguides of silica-based arrayed waveguide section is $\Delta L_{SiO_2}$, and the waveguide length difference between adjacent waveguides of silicone section is $\Delta L_{silicone}$. To remove the temperature dependence of optical path length in the arrayed waveguide section, $$\frac{d}{dT}\left|n_{SiO_2}\Delta L_{SiO_2}\right| + \frac{d}{dT}\left|n_{Silicone}\Delta L_{Silicone}\right| = 0 \quad (1)$$

must be satisfied.

The example leads to problems as below. The groove disposed in the waveguides is only filled with silicone, namely, light incident to the groove is not confined in the groove. Therefore, the light expands and spreads in the horizontal and vertical directions. That is, all of the light having propagated through the groove does not enter again in the silica-based waveguide section and hence the loss is increased (about 2 dB loss is increased in the example of the prior art). Additionally, since the value of loss depends on the groove length, the inherent power distribution of each arrayed waveguide is shifted in the silica-based waveguide section after the groove.

In the prior art, to remove the temperature dependence of the arrayed waveguide grating, the production process is extremely complex, the device insertion loss is increased, and/or the light power in the arrayed waveguides shifts from the inherent power distribution.

SUMMARY OF THE INVENTION

It is therefore an object of the present invention to provide a method of producing, in a simple process, a temperature-independent arrayed waveguide grating with reduced excess loss.

In accordance with the present invention, there is provided a method of inserting a groove in the arrayed section. The groove section includes a subsection to confine light incident to the groove section to suppress spreading of the light in the horizontal and vertical directions. Resultantly, excess loss possibly caused by the insertion of the groove is reduced. It is therefore possible to provide a temperature-independent arrayed waveguide grating with minimized loss.

Specifically, in the wedge-shaped groove section disposed in the arrayed waveguide section of the arrayed waveguide grating or in the silica-based waveguide section in a periphery of the wedge-shaped groove section, either one of the following modifications or a particular combination thereof is conducted to suppress the spreading of the light in the groove section. The excess loss due to the addition of the groove is advantageously lowered.

1. The material with a negative refractive index temperature coefficient value filled in the groove is photosensitive. Using photosensitivity, refraction difference is disposed in the groove section to form optical waveguides in the horizontal direction or in the horizontal and vertical direction.
2. The material with a negative refractive index temperature coefficient value filled in the groove has a high refractive index. This minimizes a spreading angle of light incident to the groove section from the silica-based waveguide section. In the prior art example, the groove filling material is silicone having a refractive index of 1.39.
3. Width of the silica-based waveguide section is enlarged before and after the groove section to reduce a spreading angle of light incident to the groove section from the silica-based waveguide section.

Polymer is generally used as the material having a negative refractive index temperature coefficient value.

By the configuration including the sections, the excess loss due to the groove inserted in the arrayed waveguide section of the arrayed waveguide grating can be lowered. This leads to a temperature-independent arrayed waveguide grating with minimized loss.

BRIEF DESCRIPTION OF THE DRAWINGS

The objects and features of the present invention will become more apparent from the consideration of the following detailed description taken in conjunction with the accompanying drawings in which:

FIG. 5 is a diagram schematically showing a second embodiment of an arrayed waveguide section of an arrayed waveguide grating in accordance with the present invention;

FIG. 7 is a schematic diagram showing a third embodiment of an arrayed waveguide section of an arrayed waveguide grating in accordance with the present invention;

FIG. 11 is a magnified view of a groove section and a periphery thereof in an arrayed waveguide section of an arrayed waveguide grating in the prior art.

DESCRIPTION OF THE PREFERRED EMBODIMENTS

Figure 1:
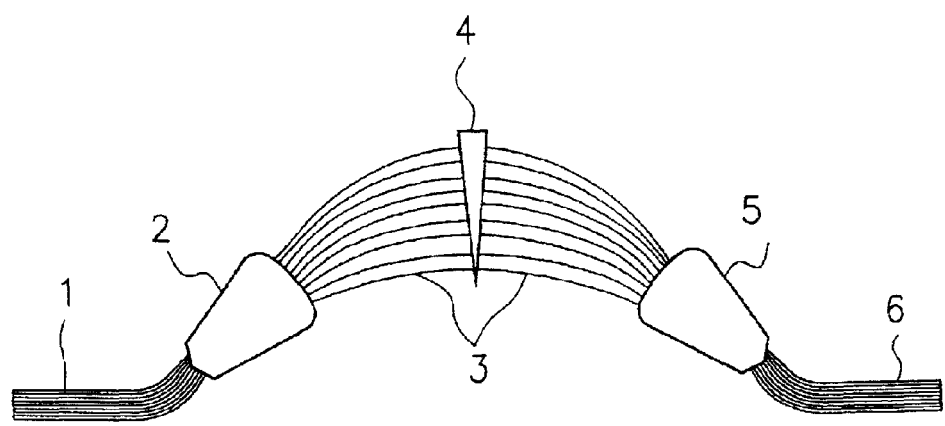
FIG. 1 is an enlarged perspective diagram showing an arrayed waveguide grating in accordance with the present invention.
Figure 2:
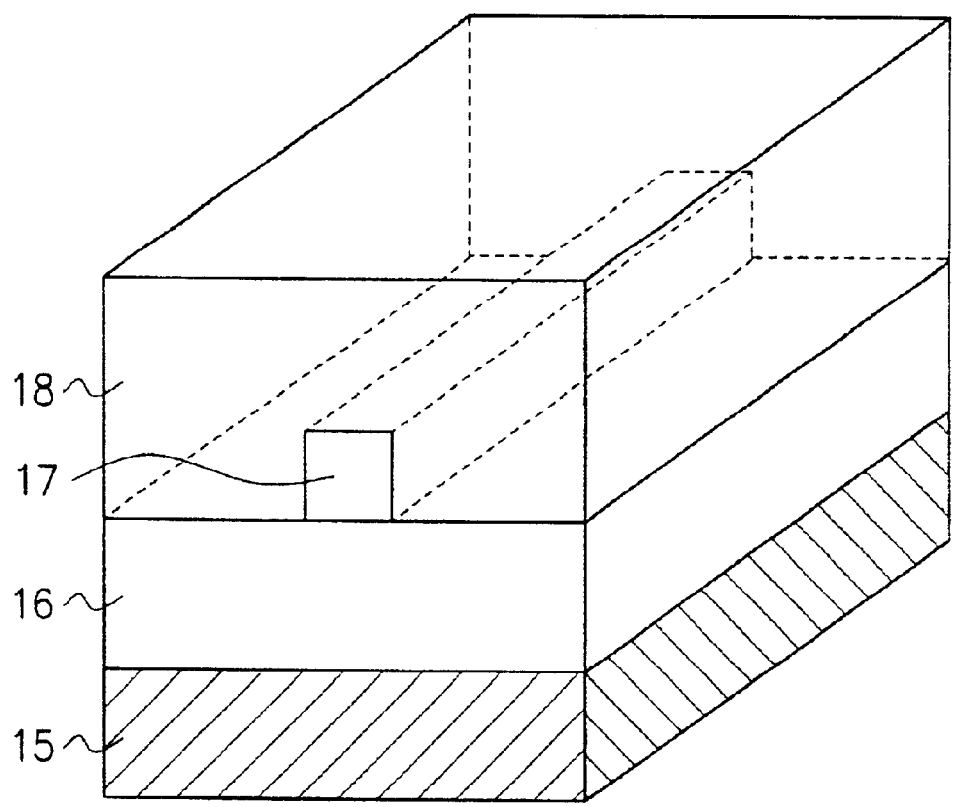
FIG. 2 is a cross-sectional view showing a silica-based waveguide section of an arrayed waveguide grating.

FIG. 1 shows an outline or an overall configuration of an arrayed waveguide grating constructed in accordance with the present invention and FIG. 2 shows a cross-sectional view of a silica-based waveguide section of an arrayed waveguide grating constructed in accordance with the present invention. The arrayed waveguide grating of FIG. 1 includes an input waveguide section 1, an input slab waveguide section 2, an arrayed waveguide section 3, a groove section 4 reaching a substrate, an output slab waveguide section 5, and an output waveguide section 6.

The silica-based waveguide section (including the input and output waveguide sections and the arrayed waveguide section) includes a lower clad layer 16 formed on a substrate 15, a core region 17 fabricated with material having a refractive index slightly larger than that of material of the lower clad 16, and an upper clad layer 18 manufactured with material having a refractive index slightly lower than that of material of the core region 17. Although the lower and upper clad layers are in general of the same material, these layers may be fabricated with different materials only if the condition regarding the refractive index is satisfied.

Figure 3:
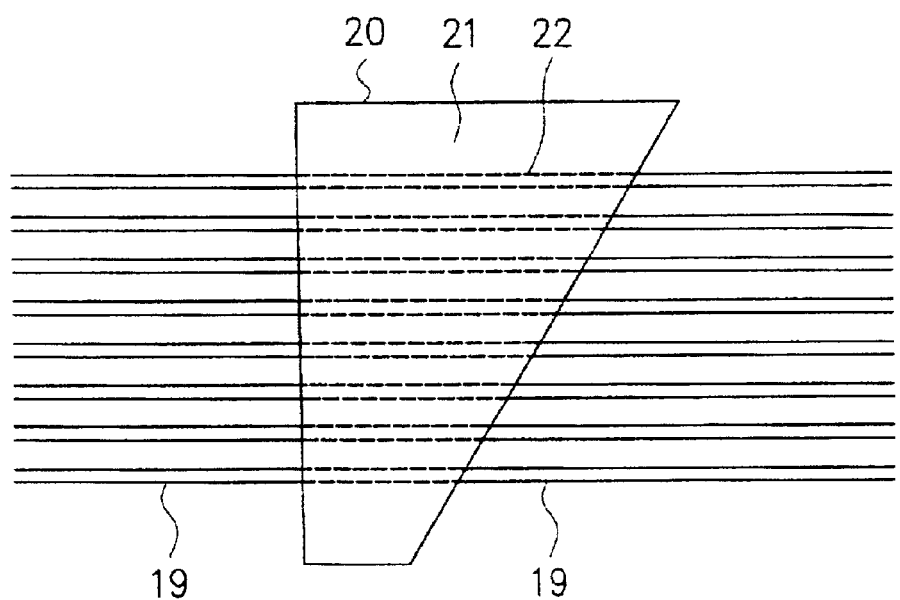
FIG. 3 is a schematic diagram showing a first embodiment of an arrayed waveguide section of an arrayed waveguide grating in accordance with the present invention.

FIG. 3 shows a magnified view of a first embodiment of an arrayed waveguide section of an arrayed waveguide grating in accordance with the present invention. The configuration of FIG. 3 includes arrayed waveguides (silica-based waveguides) 19, a wedge-shaped groove 20 formed in the waveguide section 19 to reach the substrate material 15 (i.e., the upper clad layer 18, the core region 17, and the lower clad layer 17 are accordingly removed), and photosensitive polymer 21 and 22 (having a negative refractive index temperature coefficient) filled in the groove 20.

When photosensitive polymer is filled in the groove 20, between the regions 21 and 22 they have no boundary, namely, they are equal to each other. In an operation to radiate a light beam onto the polymer to increase the value of refractive index, the region 22 has a high value of refractive index as a result. Conversely, in an operation to radiate a light beam onto the polymer to reduce the value of refractive index, the region 21 has a low value of refractive index as a result. Design values for the arrayed waveguide section satisfy the condition of expression (1).

In the prior art, the groove 4 shown in FIG. 1 is only filled with silicone having a negative refractive index temperature coefficient. In accordance with the present invention, the polymer is photosensitive. The photosensitive polymer, also called photopolymer, has a characteristic in which its refractive index changes in response to light having a particular wavelength. The present invention uses a refractive index modulation of the photosensitive polymer.

In a specific manufacturing or production method, an arrayed waveguide grating section is first fabricated by an ordinary process as below. 1. A lower clad layer is formed on a substrate material; 2. a core region is fabricated thereon; 3. an arrayed waveguide grating pattern is copied onto the core by a photolithography process, 4. the core is etched; and 5. an upper clad layer is formed.

After the arrayed waveguide grating section is fabricated, a pattern of the groove is copied onto the array section of the arrayed waveguide grating region and then the upper clad layer 18, the core 17, and the lower clad layer 16 corresponding to the groove are etched. The groove is then filled with photosensitive polymer. The polymer is then set or hardened.

If the refractive index of the photo polymer is increased when radiated by light, light is radiated onto only a portion of the polymer in the groove, the portion corresponding to the region (22 in FIG. 3) from which the core region 17 is removed. Therefore, a core region is formed. This results in an optical waveguide with the core extending in a vertical direction (in a horizontal direction parallel to the substrate).

If the refractive index of the photo polymer is lowered when radiated by light, light is radiated onto only a portion of the polymer in the groove, the portion corresponding to the regions (21 in FIG. 3) from which the clad regions 16 and 18 are removed. This forms a clad region and results in an optical waveguide with the clad extending in a vertical direction.

In the method, by forming optical waveguides also in the groove section, the spreading of light in the vertical direction is suppressed in the groove.

Figure 4:
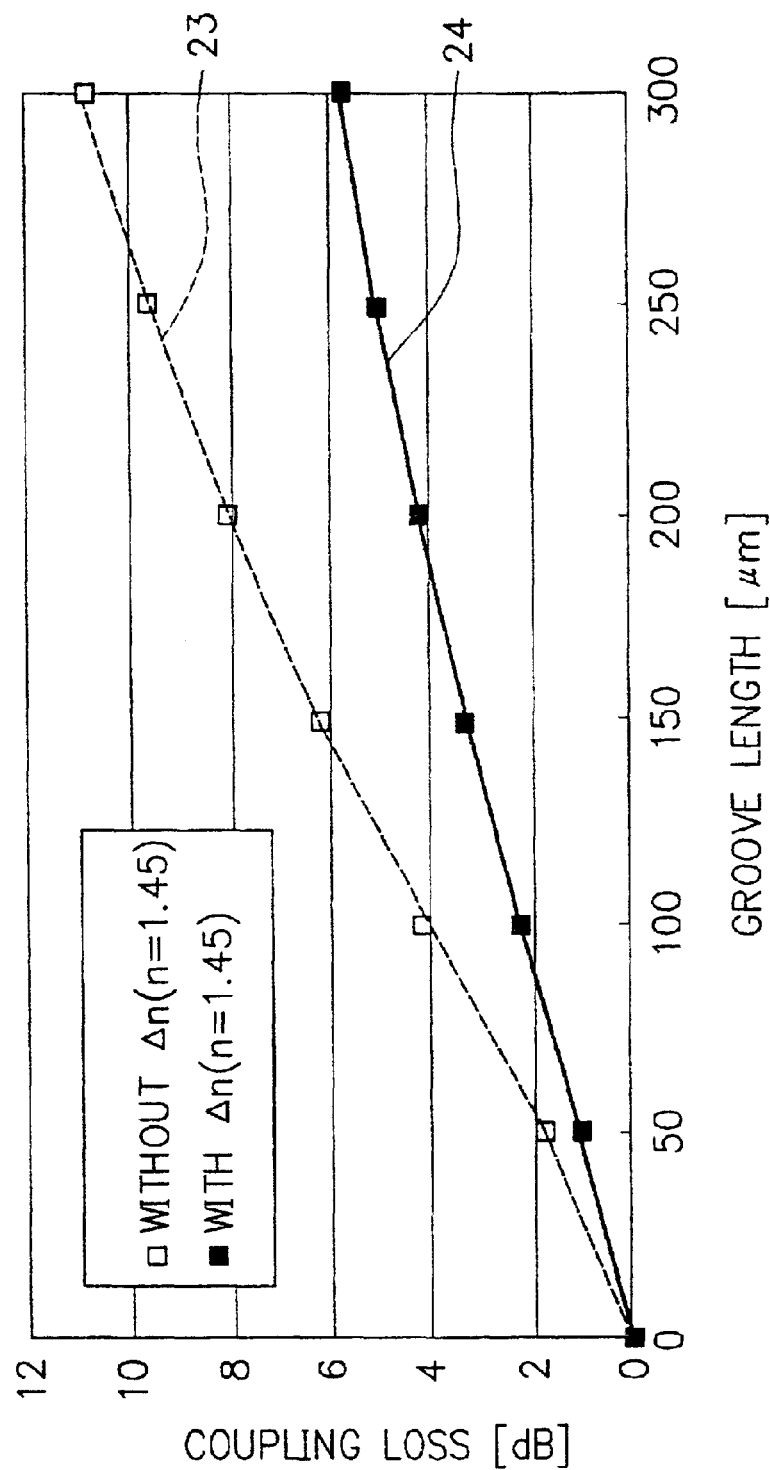
FIG. 4 is a graph showing results of analysis of loss in a groove section in the first embodiment.

FIG. 4 shows, in a graph, improvement of the loss characteristic of the groove section of the first embodiment. In the configuration of FIG. 2, each of the upper and lower clad layers 16 and 18 has a thickness of 15 micrometers ($\mu$m), the core 17 has a contour of 5.5 $\mu$m×5.5 $\mu$m, each of the upper and lower clad layers 16 and 18 has a refractive index of 1.4526, the core 17 has a refractive index of 1.4629 (corresponding to relative refractive-index difference $\Delta$=0.7%). In the configuration, polymer is filled in a groove of the optical waveguide section to analyze variation in the loss with respect to length of the groove (along a light propagating direction).

In FIG. 4, a line 23 represents the loss when the polymer has a refractive index of 1.45 (corresponding to the prior art). Line 24 indicates the loss when the refractive index of the polymer in the groove associated with the original core 17 is changed to set relative refractive-index difference $\Delta n$ to 0.7%. When the refractive index of the polymer in the groove corresponding to the original core 17 is increased to confine light in the vertical direction, the value of loss is reduced to about a half that of the case in which the groove is only filled with the polymer. By reducing the refractive index of the polymer in the groove corresponding to the original core 17 to set the relative refractive-index difference, a similar result is obtained.

In the embodiment, to change the refractive index of the polymer in the groove corresponding to the original core section (clad section), the photosensitive polymer is filled in the groove, a mask of the original waveguide pattern is placed over the groove, and uniform light is applied thereonto in a manner similar to an ordinary photolithography process to copy the waveguide pattern onto the photosensitive polymer filled in the groove.

However, the refraction index difference is obtained only in the vertical direction, not in the longitudinal direction (orthogonal to the substrate). If a refractive index change section can be drawn in the photosensitive polymer in a three-dimensional manner using a laser light which can be focused only onto one point, it is possible to confine light in the vertical and horizontal directions. The loss can be more reduced as compared with the analysis result of the example of the prior art as indicated by the line 24 in FIG. 4.

The photosensitive polymer used in the embodiment must have a negative refractive index temperature coefficient. Additionally, it is desirable that the polymer is superior in transparency and in controllability of the refractive index by photo sensitizing, does not change with respect to time (no deteriorate with age) and desirably includes a weather-proof polymer.

The refractive index can be correctly controlled with high repeatability or reproducibility according to a period of light radiation time and intensity of light radiated. Table 1 shows light exposure, wavelengths, and the relative refractive index difference of photopolymers.

TABLE 1

| Photopolymer | Light exposure (mJ/cm$^2$) | Wavelength (nm) | $\Delta$ n |
| --- | --- | --- | --- |
| n-vinyl carbazole + methacrylic monomer | 750 | 325 | 0.002 |
| Omnidix (Dupon) | 5 | 442–647 | 0.068 |
| Metacrylic monomer + acrylic monomer | 400 | 442 | 0.016 |
| Acrylic monomer + epoxy | — | — | 0.006 |
| Acrylic monomer | 200 | 488 | 0.002 |
| Polysilane | 255 | 370 | 0.021 |

As can be seen from FIG. 4, the shorter the groove is, the smaller the loss value is. However, to minimize the groove length, the value of $\Delta L_{silicone}$ of expression (1) need only be reduced for an equal number of arrays. For the purpose, it is desirable that the polymer has a large absolute value of the refractive index temperature coefficient.

FIG. 5 shows, in a magnified view, the second embodiment of the arrayed waveguide section of the arrayed waveguide grating in accordance with the present invention. The configuration of FIG. 5 includes arrayed waveguide section 19 (including silica-based waveguides), a wedge-shaped groove 20 formed in the waveguide section 19 to reach a substrate, and polymer 38 filled in the groove 20, the polymer having a large value of refractive index and a negative refractive index temperature coefficient.

When light propagating through an optical waveguide enters a uniform medium, the light spreads as the light propagates therethrough if the medium does not include structure to confine the light.

Assume that the uniform medium has a refractive index of n, the propagating light has a spot size of w (the spot size is 1/e at half-width ($1/e^2$ at half-width of power distribution) from a peak value when an electric-field distribution in a guided mode is fitted using Gaussian distribution), and a propagation constant of k (=$2\pi/\lambda$; $\lambda$: wavelength in vacuum) in vacuum. An angle of radiation θ of light emitted into the uniform medium is represented as $$\theta = \tan^{-1}[1/knw] \qquad (2)$$

In the embodiment, the value n of refractive index in expression (2) is increased. That is, the polymer filled in the groove 20 is polymer 38 having a refractive index larger than that of the silica of the arrayed waveguides to thereby minimize a spreading angle of light in the groove 20. This resultantly reduces a coupling loss when the light enters the silica-based waveguide section 19 again from the groove 20.

Figure 6:
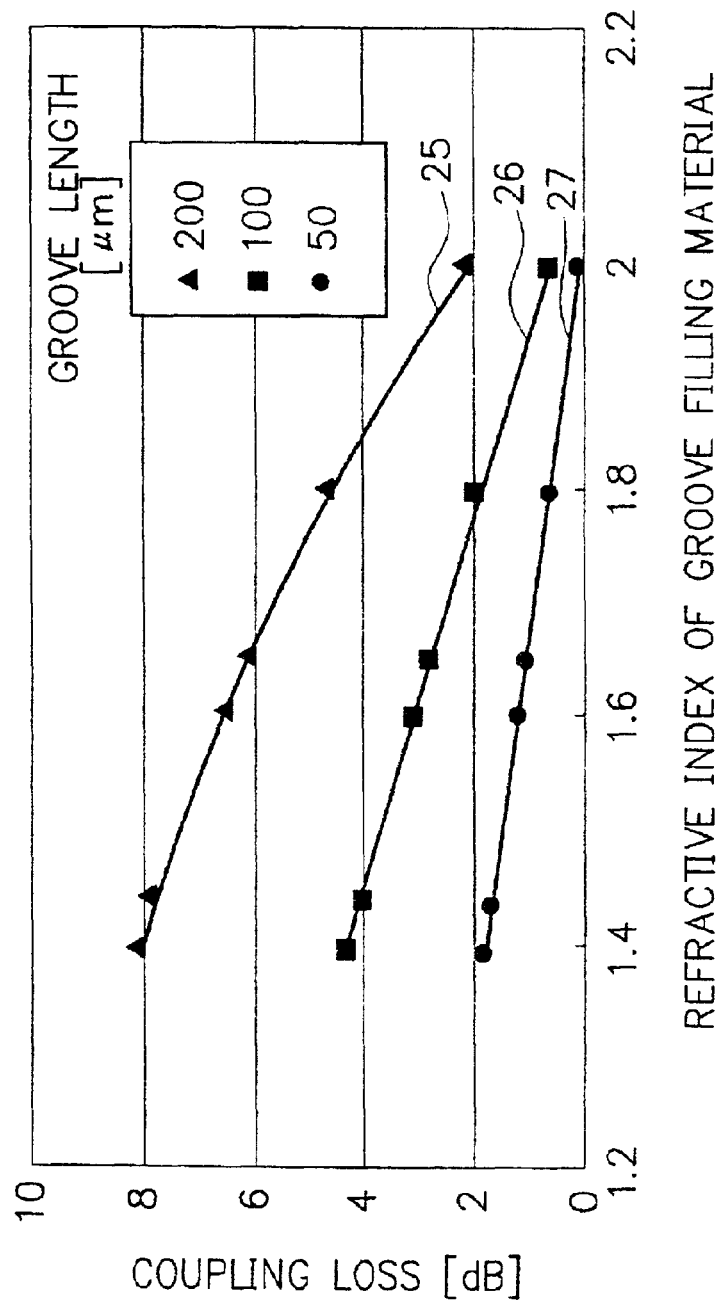
FIG. 6 is a graph showing analysis results of loss in a groove section in the second embodiment.

FIG. 6 shows, in a graph, analysis results of the excess loss due to insertion of the groove for various values of the refractive index of the polymer in the groove. The parameters of the silica-based waveguide section are the same as those of the first embodiment. In the graph, lines 25, 26, and 27 represent results when the groove length is 50 μm, 100 μm, and 200 μm, respectively. As can be seen from the graph, when the refractive index becomes greater, the loss remarkably decreases when compared with the case of the refractive index of 1.39 of the silicone in the temperature-independent arrayed waveguide grating of the prior art (Y. Inoue et al, Electron. Lett., Vol. 33, No. 23, pp. 1945–1947, 1997).

Referring to FIG. 6, in comparison with the case of the refractive index of 1.39, to reduce the loss (in dB) down to a half the original value, it is only necessary to set the refractive index to about 1.8 or more. To reduce the loss down to a quarter the original value, it is only necessary to set the refractive index to about 2.0 or more. Although the loss minimizing effect is expectable when the refractive index is more than that (about 1.45) of silica constituting the arrayed waveguide section, it is more desirable that the refractive index is equal to or more than 1.6. In the embodiment, the effect leads to suppression of the spreading of light in the groove in the horizontal and vertical directions.

FIG. 7 shows, in an enlarged view, a third embodiment of an arrayed waveguide section of an arrayed waveguide grating in accordance with the present invention. In the third embodiment, the spreading angle of light in the groove is decreased by increasing the value of spot size w in expression (2). This decreases the loss of light entering again in the silica-based waveguide section from the groove.

To increase the value of spot size w of the light propagating through the silica-based waveguide section, it is only necessary to expand a diameter of the core of the silica-based waveguide section. In the embodiment, the core is enlarged in the horizontal direction before and after the groove. As a result, the spot size w of the light is increased in the horizontal direction.

The configuration of FIG. 7 includes an arrayed waveguide section (including silica-based waveguides) 28, a portion 29 of each silica-based waveguide in which the core is enlarged in the vertical direction, a wedge-shaped groove section 30 formed in the arrayed waveguide section 28 to reach a substrate (i.e., all associated region of the upper clad layer, the core, and the lower clad layer are removed), and filling material (polymer) 31 filled in the groove 30, the polymer having a negative refractive index temperature coefficient.

When the core width of the silica-based waveguide section is abruptly increased, a mode change loss takes place. To overcome the difficulty, there is provided a tapered section of appropriate length in the core to gradually change the contour of the core in an adiabatic manner.

Figure 8:
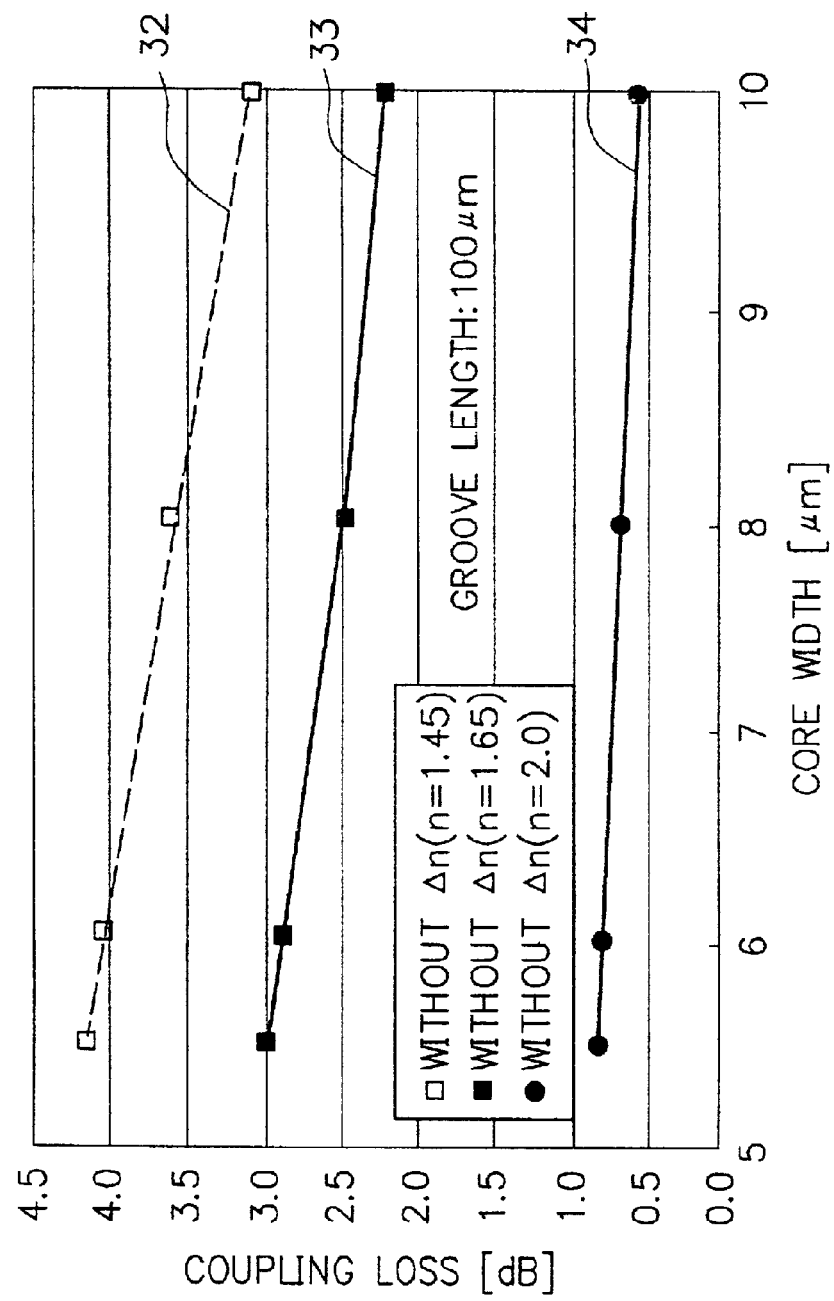
FIG. 8 is a graph showing results of analysis of loss in a groove section in the second embodiment.

FIG. 8 shows, in a graph, analysis results of the excess loss caused by the groove insertion with respect to change in the core width of the silica-based waveguide section before and after the groove. The parameters other than the width of the silica-based waveguide section are the same as those of the first embodiment. The groove length is fixed to 100 μm in the analysis. In the graph of FIG. 8, lines 32, 33, and 34 indicate analysis results respectively for the values 1.45, 1.65, and 2.0 of refractive index of the polymer.

As shown in FIG. 8 in which the groove length is 100 μm and the polymer in the groove has a refractive index of 1.45, the loss is minimized by about 1 dB when the core width is set to 10 μm. Moreover, the lower the refractive index of the polymer is, the more effective the enlarging of the core width is.

Description has been given of embodiments in accordance with the present invention. By combining the embodiments with each other, a remarkable multiplier effect is obtainable. However, for the light confinement in the vertical direction, no particular effect is attained even by combining the first embodiment (the polymer in the groove has refractive index difference) and the third embodiment (the silica-based waveguide section has an expanded core width). To reduce the loss, the first embodiment (using the refractive index difference) is combined with the second embodiment (using polymer with a high refractive index) or the second embodiment (using polymer with a high refractive index) is combined with the third embodiment (only the refractive index difference is necessary when the three-dimensional confinement of light is possible in the groove section).

Figure 9:
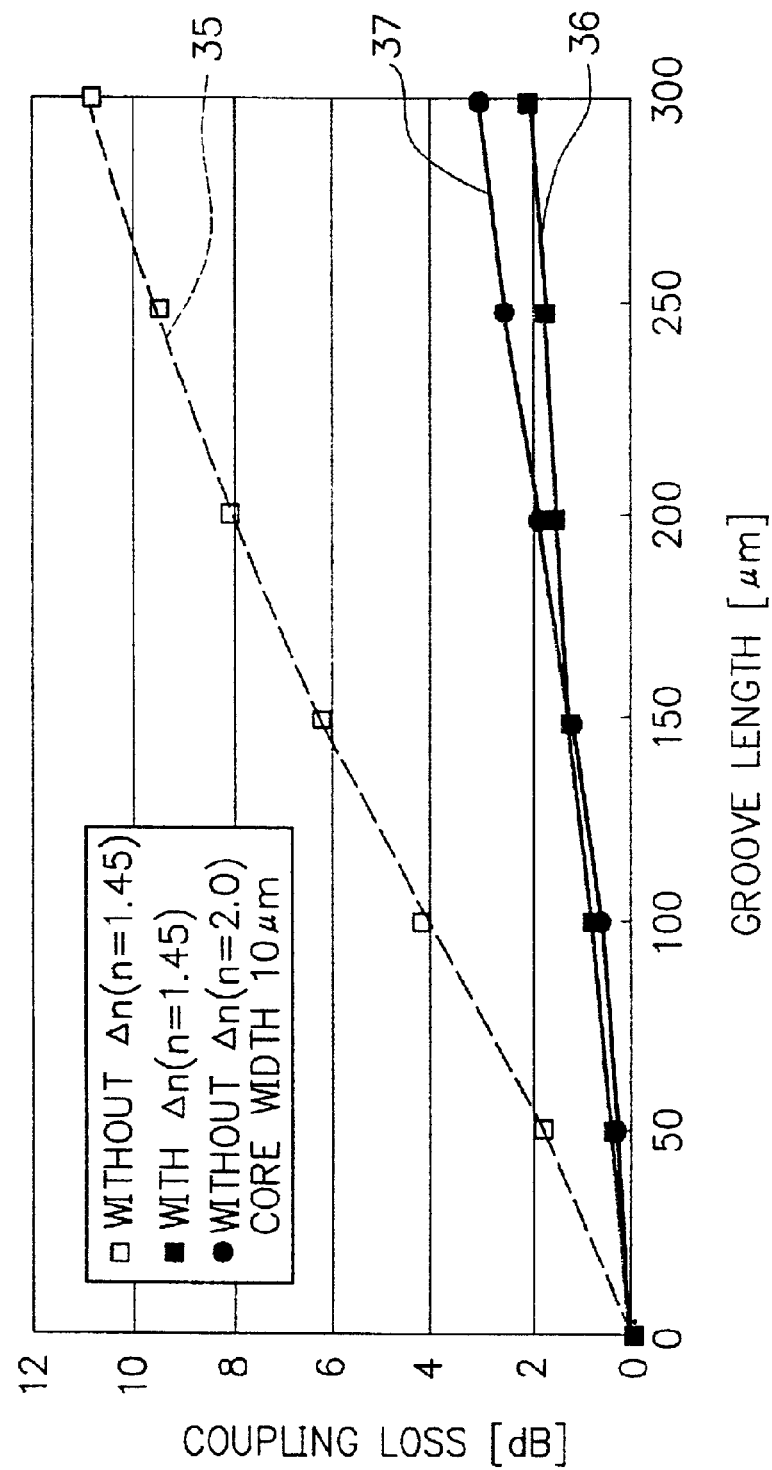
FIG. 9 is a graph showing analysis results of loss in a groove section when the embodiments are combined with each other.
Figure 10:
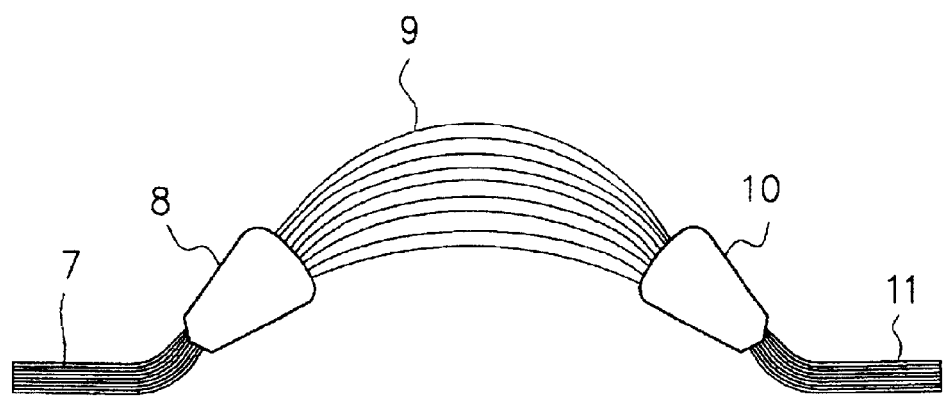
FIG. 10 is a diagram showing an overall configuration of an arrayed waveguide grating in the prior art.

FIG. 9 shows analysis results of respective cases in a graph. In the graph of FIG. 9, a line 35 demonstrates results of analysis of a configuration in which polymer having an ordinary refractive index is filled in the groove according to the prior art. A line 36 shows analysis results of a combination of the first and second embodiments. A line 37 represents analyzed results of a case in which the second and third embodiments are combined with each other. As can be seen from the graph of FIG. 9, the excess loss caused by the insertion of the groove is much more reduced in accordance with the present invention when compared with the prior art.

Description will now be given of a concrete design example of the groove. Applying the following expression (3) to the left term of expression (1), $$\frac{d}{dT}|n\Delta L| = \Delta L\frac{dn}{dT} + nd\Delta\frac{L}{dT} \quad (3)$$

expression (1) is reduced to $$\Delta L_{SiO_2}\frac{dn_{SiO_2}}{dT} + n_{SiO_2}\frac{d\Delta L_{SiO_2}}{dT} + \\ \Delta L_{polymer}\frac{dn_{polymer}}{dT} + n_{polymer}d\Delta\frac{L_{polymer}}{dT} = 0 \quad (4)$$

In general, a layer of material of the substrate is sufficiently thicker than the waveguide layer. Therefore, the thermal expansion coefficient $(1/L)(dL/dT)$ of the waveguides can be approximately expressed as a thermal expansion coefficient of the substrate $\alpha_{sub}$, and hence expression (4) becomes $$\Delta L_{SiO_2}\frac{dn_{SiO_2}}{dT} + \\ \Delta L_{polymer}\frac{dn_{polymer}}{dT} + |n_{SiO_2}\Delta L_{SiO_2} + n_{polymer}\Delta L_{polymer}|\alpha_{sub} = 0 \quad (5)$$

The parameters are, for example, $n_{sio2}=1.46$, $n_{polymer}=1.45$, $dn_{sio2}/dT=6.0\times10^{-6}$, $dn_{polymer}/dT=-4.0\times10^{-4}$, $\alpha_{sub}-3.0\times10^{-6}$, $\Delta L_{sio2}=50\times10^{-6}$, and number of arrayed waveguides=100. According to expression (5), $\Delta L_{polymer}=1.3\times10^{-6}$ results.

When the minimum length of the groove is assumed as zero, the maximum value of the groove is about 130 μm (the length of the central section of the arrayed waveguides to which light is most distributed is a half of the maximum length, i.e., about 65 μm). However, the minimum groove length depends only on the polymer filling process. When the polymer is not completely filled in the groove due to, for example, a problem of viscosity of the polymer, the maximum groove length is set to a slightly larger value. That is, a particular offset must be provided in advance.

In a stage after the parameters of materials and constitution are determined or in a stage to determine the parameters, by appropriately using the techniques of the first to third embodiments, the increase in the loss caused by the insertion of the groove can be suppressed. This consequently leads to a temperature-independent arrayed waveguide grating in which the loss is reduced.

In accordance with the present invention, the excess loss due to the fabrication of the groove in the arrayed waveguide section of the arrayed waveguide grating can be lowered. It is therefore possible to implement a temperature-independent arrayed waveguide grating in which the excess loss is minimized.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A temperature-independent arrayed waveguide grating, comprising at least an input waveguide, an input slab waveguide including an input side and an output side, said input side of said input slab waveguide receiving light from said input waveguide, a plurality of arrayed waveguides including an input side and an output side, said input side of said plurality of arranged waveguides being connected to said output side of said input slab waveguide, an output slab waveguide including an input side and an output side, said input side of said output slab waveguide being connected to said output side of said arrayed waveguides, a plurality of output waveguides connected to said output side of said output slab waveguides;

a wedge-shaped groove formed in said arrayed waveguides; and a photosensitive polymer filled in said groove, said photosensitive polymer having a negative refractive index temperature coefficient;

wherein said photosensitive polymer disposed in said groove confines light incident to said groove in a vertical and a horizontal direction thereby preventing the light from spreading in said groove.

2. The temperature-independent arrayed waveguide grating in accordance with claim 1, wherein a difference in a refractive index is provided in said photosensitive polymer using the photosensitivity, and optical waveguides are thereby formed in said photosensitive polymer in a horizontal direction or in vertical and horizontal directions.

3. The temperature-independent arrayed waveguide grating in accordance with claim 1, wherein said photosensitive polymer filled in said groove has a refractive index higher than that of material of said arrayed waveguide grating.

4. The temperature-independent arrayed waveguide grating in accordance with claim 1, wherein width of each core of said arrayed waveguides is enlarged before and after said groove.

5. The temperature-independent arrayed waveguide grating in accordance with claim 1, wherein:

said photosensitive polymer filled in said groove has a refractive index higher than that of material of said arrayed waveguide grating; and difference in a refractive index is provided in said photosensitive polymer using the photosensitivity and optical waveguides are thereby formed in said photosensitive polymer in a vertical direction or in vertical and horizontal directions.

6. The temperature-independent arrayed waveguide grating in accordance with claim 1, wherein:

said photosensitive polymer filled in said groove has a refractive index higher than that of material of said arrayed waveguide grating; and width of each core of said arrayed waveguides is enlarged before and after said groove.

7. The temperature-independent arrayed waveguide grading in accordance with claim 1 wherein said photosensitive polymer is selected from the group consisting of n-vinyl carbazole and methacrylic monomer, omnidix, metacrylic monomer and acrylic monomer, acrylic monomer and epoxy, acrylic monomer, or polysilane.

* * * * *